UNITED STATES PATENT OFFICE.

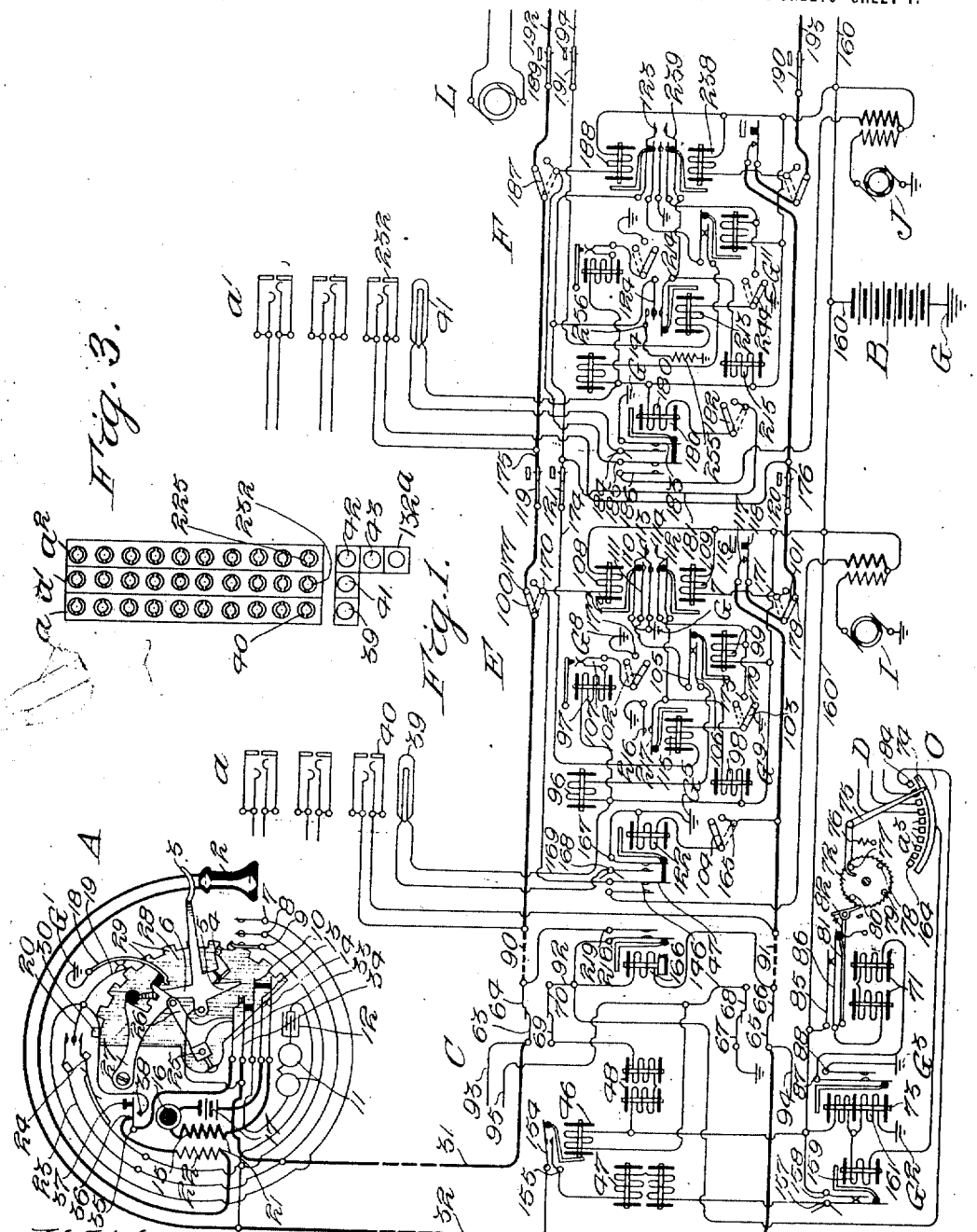

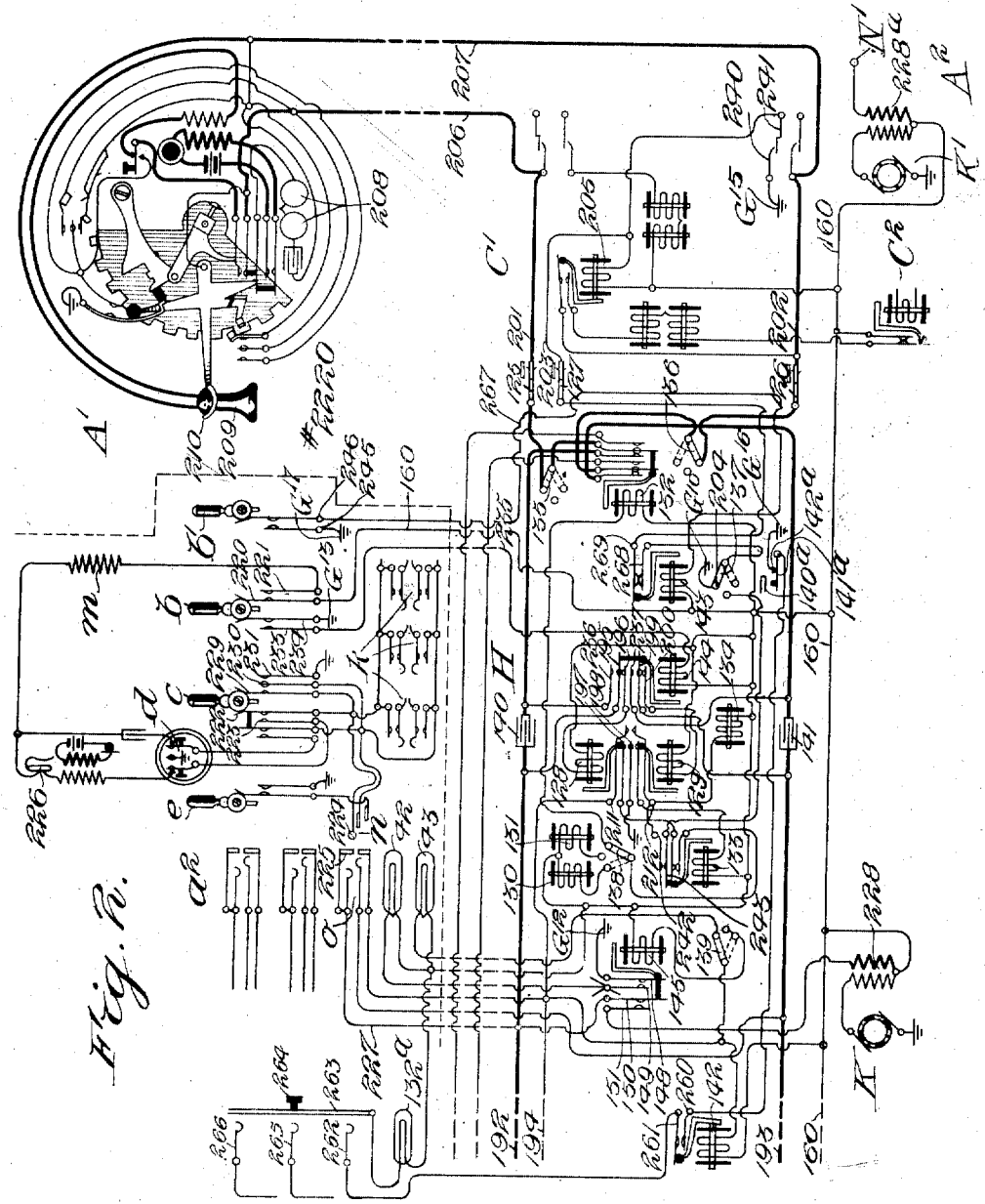

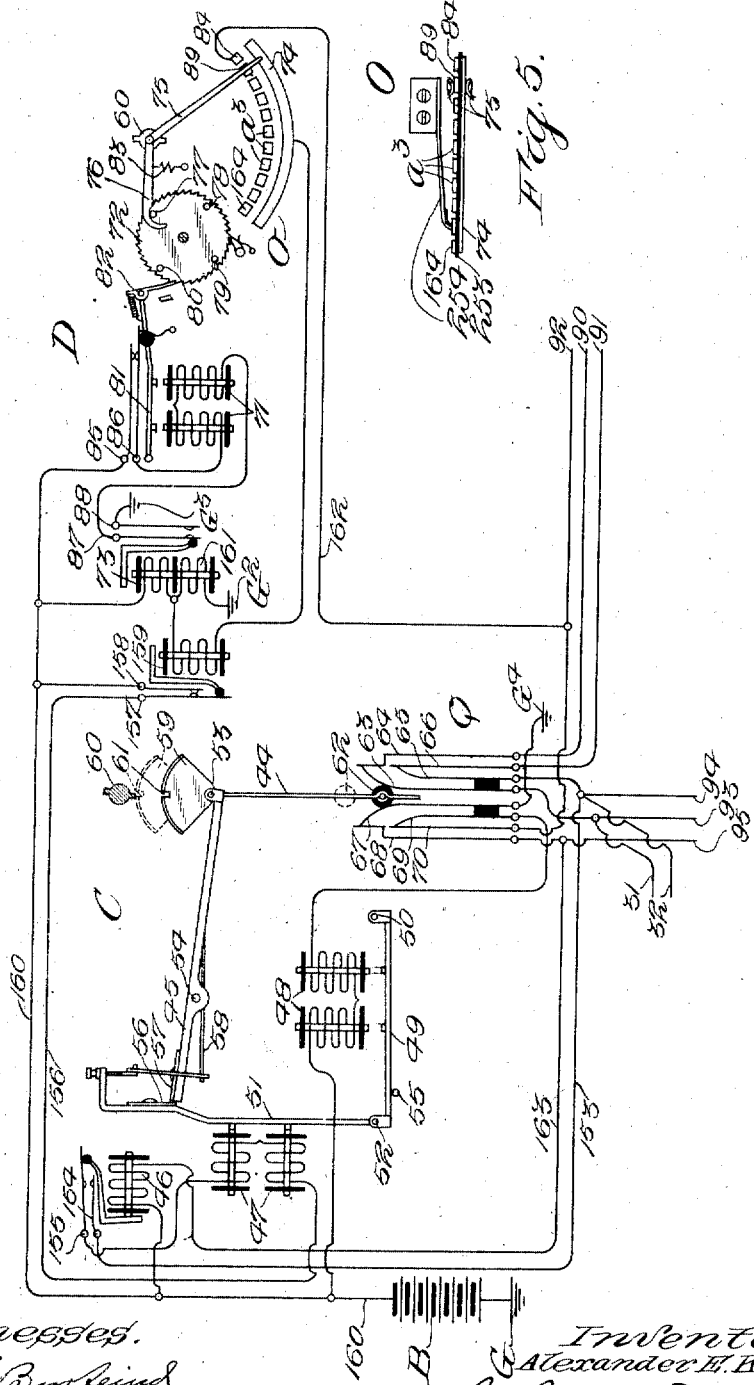

ALEXANDER E. KEITH, OF CHICAGO, ILLINOIS, ASSIGNOR, BY MESNE ASSIGNMENTS, TO AUTOMATIC ELECTRIC COMPANY, OF CHICAGO, ILLINOIS, A CORPORATION OF ILLINOIS.

SUPERVISORY SYSTEM.

1,214,686. Specification of Letters Patent. Patented Feb. 6, 1917.

Application filed May 14, 1907. Serial No. 373,650.

*To all whom it may concern:*

Be it known that I, ALEXANDER E. KEITH, a citizen of the United States of America, and resident of Chicago, Cook county, Illinois, have invented a certain new and useful Improvement in Supervisory Systems, of which the following is a specification.

My invention relates to telephone systems in general, but more particularly to automatic or semi-automatic telephone exchange systems, and especially to systems in which, owing to the location of some of the apparatus thereof at outlying or sub-central stations, or for other reasons, it is not always convenient to directly inspect such apparatus.

Generally stated, therefore, the object of my invention is the provision of improved means for manually supervising the apparatus of a telephone exchange system, without the necessity of diectly inspecting such apparatus.

Special objects are the provision of means whereby an attendant or operator sitting at a switchboard may supervise the apparatus and trace a call established through automatic or semi-automatic or other suitable apparatus, in case the connection is not released after the two subscribers are through talking, or in case the connection thus established automatically or otherwise was not released after being extended to the line of the called subscriber; the provision of a manual switchboard arrrangement by which an attendant or operator can supervise all automatic switches, and can release any automatic switch that may be found off-normal, or may report the trouble in the event that an off-normal switch refuses to release; the provision of means by which the attendant or operator supervising the exchange at the manual switchboard may know the condition of the off-normal switch—that is to say, as to whether or not it is in a fully or a partially operated condition; the provision of means whereby the attendant or operator may receive different kinds of busy-test signals for the purpose of finding different kinds of automatic switches, or for discovering different conditions of the apparatus; and the provision of certain details and features of improvement and combinations tending to increase the general efficiency and serviceability of a telephone exchange system of this particular character.

To the foregoing and other useful ends, my invention consists in matters hereinafter set forth and claimed.

In the accompanying drawings Figures 1 and 2, taken together, show diagrammatically an established connection between calling and called substations in a system embodying the principles of my invention. The said figures show a district system in which the subscribers are arranged in groups, each group allotted to a given sub-central, and the sub-centrals each being provided with trunk lines leading to a main central office. In the said figures the subscribers' substations A and A' have alloted to their lines the individual switches C and C' located in their respective sub-centrals, the switch C being controlled by the master switch D, and the switch C' by the similar switch indicated at $C^2$. The main central office switches are shown at E and F, and the connector H is located at the sub-central of the switch C' of the called line. The jack-groups $a$, $a'$ and $a^2$ are allotted to the first-selector, second-selector and connector switch groups, respectively.

Fig. 3 shows a method of arranging each jack-group with its lamp or lamps, as the case may be, below.

Fig. 4 is a diagrammatic view of the individual switch C and its master switch D.

Fig. 5 is a detail view of the master switch bank O.

The signal lamp 39 is a group lamp for the first-selector-group of which the selector E is a member, but the jacks of the group $a$ are individual to their respective selectors, exactly as the jack 40 is individual to the trunk line leading to the switch E. Similarly, the lamp 41 is allotted to the second-selector-group of which F is a member, and the jacks $a'$ are individual to each second-selector trunk. Also, the lamps 42 and 43 are common to the connector-switch-group, and the jacks of the group $a^2$ each connect with a trunk line leading to a connector-switch.

Figure 6:
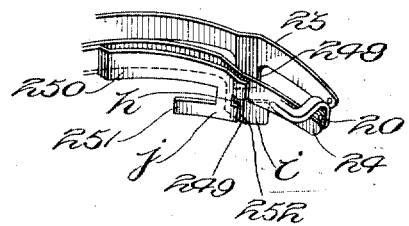
Figs. 6, 7, 8, 9, 10, 11 and 12 are detail views showing the various positions of the impulse springs.
Figure 7:
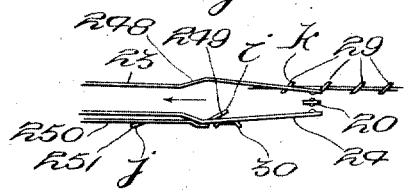
Figure 8:
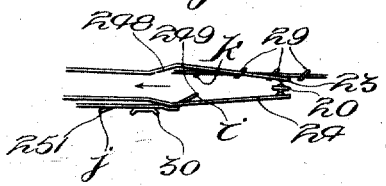
Figure 9:
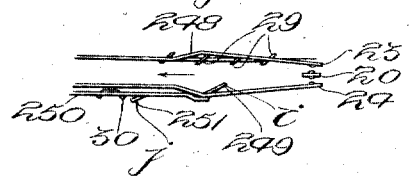
Figure 10:
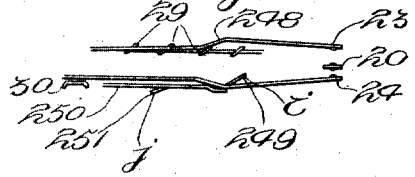
Figure 11:
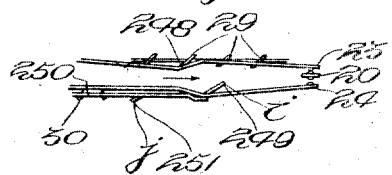
Figure 12:
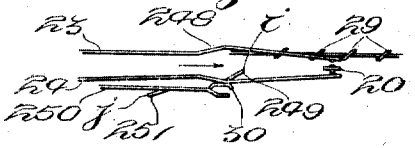

The substation A may be of any suitable or approved character. The one shown comprises a receiver 2, a switch-hook 3 for controlling the substation circuits, which controlling operations are accomplished through the medium of any suitable means, such as the cam-arms 4, 5 and 6. As the switch-hook is lowered the cam-arm 4 momentarily presses the release springs 7, 8 and 9 into engagement, whereby the substation line conductors may be grounded simultaneously. When the switch-hook is down the cam-arm 5 engages the spring 10, thereby bridging the ringer 11 in series with the condenser 12 across the line. Furthermore, when the switch-hook is down the said cam-arm 5 disengages the springs 13 and 14, thus breaking the local circuit which includes in series the primary winding 15, transmitter 16 and local battery 17. The substation ground circuit is normally broken between the ground springs 18 and 19 by the cam-arm 6; but when said springs are together, ground connection is provided to the ground post 20, and to the release spring 7, as is usually the case in telephones of this type. The said substation comprises the usual induction-coil 21 having the primary winding 15 and secondary winding 22. Being an automatic substation it is provided with the usual vertical and rotary impulse springs 23 and 24. Said substation is, of course, provided with a dial (not shown) which is secured to the shaft 25, together with the locking dog 26. Furthermore, there is a locking cam 27 that locks the dog 26 while the receiver is on the switch-hook, to prevent a rotation of the dial. For operating the impulse springs 23 and 24 the substation is provided with an impulse wheel 28 that is secured to the shaft, which impulse wheel carries on its periphery the so-called vertical impulse teeth 29 and one rotary impulse tooth 30. The said impulse teeth are so arranged that when the dial is drawn down the impulse spring 23 is not carried into contact with the ground post 20, but only as the dial returns, whereby the vertical teeth engage the vertical impulse spring 23 and press it onto the ground post 20; and after they have completed their work the rotary tooth 30 then operates the rotary impulse spring 24. In this operation the subscriber's vertical line conductor 31 is first given a number of ground impulses, and then the rotary line conductor 32 is given one ground impulse. It will be seen that as long as the dial is out of normal position the dog 26 permits the primary circuit springs 33 and 34 to separate, thus preventing the impulses that are delivered to either line conductor from passing to the other. The vertical impulse spring 23 is provided with an oblique projection or lug 248 (Fig. 6) on its under side, with which the vertical impulse teeth 29 are adapted to engage for driving the spring 23 intermittently onto the ground post 20. The rotary impulse spring 24 is provided with somewhat similar mechanism for driving the said rotary spring onto the ground post once when the dial is rotated in one direction and once when rotated in the opposite direction. The said rotary impulse spring 24 has on its under side a V-shaped member 249 having two sides $i$ and $h$, and there is in addition an auxiliary spring 250 which works in conjunction with the said V-shaped member. As shown more clearly in Fig. 6, the auxiliary spring 250 is provided with a lower curved part $j$ having the rear section 251 curving outwardly, as shown also in Figs. 7 to 12, inclusive. The front section 252 of said member $j$ is designed to fall just below the apex of the V-shaped member 249, so that the rotary impulse tooth 30, when moved in the direction indicated by the arrows in Fig. 7, will pass onto the curved member $j$, thus pressing the rotary impulse spring 24 onto the ground post 20 for a comparatively long time, as shown in Fig. 8, thus sending a comparatively long impulse to the line. As the impulse wheel advances, the vertical impulse teeth 29 approach the lug 248 of the vertical impulse spring 23 (Fig. 8), and eventually the first tooth $k$ that meets the lug 248 clears the said lug, as shown in Fig. 9, but not until after the rotary impulse tooth 30 clears the curved member $j$. As the impulse wheel continues to advance in the direction of the arrow in Fig. 9, the succeeding impulse tooth will clear the projection 248, as shown in Fig. 10. Then when the impulse wheel is released, first the vertical impulse spring 23 is carried into engagement with the ground post 20 twice, as indicated in Fig. 11, but as the impulse wheel nears its normal position the rotary impulse tooth 30 passes under the curved member $j$ of the auxiliary spring 250 (Fig. 12), engaging the V-shaped member 249 directly and for a short time only, sending the ordinary impulse through the medium of the rotary impulse spring 24 to the line, after which the said member 249 is cleared, as shown in Fig. 7, as the impulse wheel reaches its normal position. As thus described, the operations are repeated each time that the dial is operated, and the number of impulses produced through the medium of the vertical impulse spring 23 is accurately and definitely determined at each operation of the dial by the particular finger-hole which the subscriber previously selects on the dial. Means whereby the subscriber may signal the called subscriber comprises the push-button spring 35 which normally engages the contact point 36; but when the button 37 is pressed the spring 35 engages the contact point 38, whereby the vertical line conductor 31 may be grounded. Furthermore, the telephone is so constructed that when the dial goes forward the rotary impulse tooth 30 presses the rotary impulse spring 24 so that it will come in contact with the ground post 20, whereby a preliminary ground impulse is sent to the rotary side of the line; and when the dial returns, the impulse to the rotary side is then broken, at which time the impulses are sent to the vertical side of the line. Such a substation is described in United States patent application of John Erickson, Serial No. 343,043, filed December 21, 1906. The substation may also be provided with a governor (not shown) for controlling the speed of the impulse wheel 28 and the switch-hook 3, which may be of any suitable or known design.

The individual or line switch C (Fig. 4) is of the general form disclosed in my prior United States patent application, Serial No. 311,327, filed April 12, 1906. The said switch comprises a plunger 44, plunger arm 45, bridge-cut-off relay 46, trip magnet 47 and switch-release magnet 48, all of which are built about a switch-base or frame (not shown). The said switch-release magnet is provided with an armature 49 that is pivoted on a pin 50 which rises from the base of the switch. The said armature carries pivotally secured on its end a second armature 51 that is controlled by the trip magnet 47. The pin 52 about which the armature 51 oscillates is carried on the end of the armature 49. The plunger 44 is pivotally secured by the pin 53 to the plunger arm 45, which latter is in turn pivoted to a pin 54 that rises from the switch-frame. The lug 55 is stamped out of the side of the frame and is provided as a stop or rest for the armature 49. Upon the armature 51 is secured the catch spring 56 for engaging the spring 57 on the end of the plunger arm 45. Furthermore, the said line switch is provided with a bank of terminals, usually ten in number but only one of which is shown at Q in Fig. 4. As shown, the said terminal Q is not in its true position with respect to the swing of the plunger 44, and the bushing 62 is correspondingly turned, all for the purpose of making the illustration clearer. The terminal Q comprises the springs 63 and 64, 65 and 66, 67 and 68, and 69 and 70. The said springs are normally disconnected from each other, but are driven into contact in the above mentioned order when the plunger 44 operates. Normally the plunger 44 is, however, retained out of engagement with the line switch bank and in either locked or sliding engagement with the plunger-controlling shaft 60, which latter is operated by the master switch D. When the plunger 44 is in locked engagement with the plunger shaft 60 the notch 61 is in engagement with the flange or web of the shaft 60, and when in sliding engagement the hub rests in the position shown by the dotted lines in Fig. 4—that is, when the plunger shaft is operated the plunger 44 is not carried along with the locked plungers, but remains in the dotted position, the plunger shaft sliding upon the end 59. The general operation of the switch is as follows: The trip magnet 47 is energized by a preliminary impulse, and the armature 51 is attracted against the magnet cores. When the armature 51 (Fig. 4) is attracted the catch 56 slides out of contact with the end 57 of the plunger arm 45, and the said plunger arm 45, owing to the tension of the spring 58, moves about the pin 54 and thrusts the plunger 44 into the bank terminal Q shown in Fig. 4, and when the trip magnet again deënergizes, the trip armature 51 falls against the end of the plunger arm 45. The switch is restored when the release magnet 48 becomes energized, whereby the armature 49 is attracted, and accordingly the trip armature 51 is moved upwardly until the catch 56 again slides over the end 57; then when the release magnet 48 becomes deënergized the armature 49 returns to normal position and remains at rest against the stop 55. Furthermore, since the plunger arm 45 is now in engagement with the armature 51, the said plunger arm is also moved about the pin 54, whereby the plunger 44 is moved from the terminal Q. Also, since the plunger shaft has advanced one step, the hub 59 of the plunger 44 comes to rest in the position shown by the dotted lines in Fig. 4, against the plunger shaft 60, and as the said plunger shaft advances each time an idle trunk is seized, the plunger 44 is not advanced, but remains in this position opposite the trunk terminal from which it has just disengaged, since the slot 61 is not in engagement with the plunger shaft 60. After all the trunk lines have been successively seized, and the shaft 60 is released from its last position, said shaft then starts toward starting point and picks up the plunger 44, when the saddle of the said shaft, over which the slot 61 normally rides, arrives at the position at which the plunger 44 was originally released. From thence on the plunger 44 is carried by the shaft 60 until it is again released when another call is made. But if, after the plunger is released, and before the shaft 60 returns to pick up said plunger, the switch C is again operated, the plunger 44 again engages the same terminal Q. The master switch D, which may be of any suitable or approved type, is provided for operating the plunger shaft 60, and for controlling certain circuits that will be disclosed hereinafter. It comprises the following details: A motor magnet 71 for operating the ratchet wheel 72, which latter is designed for operating the plunger shaft 60, and a differential relay 73 for controlling the energizing circuit of the motor magnet 71. The said master switch also has a bank O comprising a plurality of individual contact segments $a^3$ and a metallic segment 74, as shown in Fig. 4. The wiper 75 is adapted to remain in constant engagement with the bank O, and to maintain some one of the segments $a^3$ in electrical connection with the common segment 74. The wiper 75 is operated in a step-by-step manner by the ratchet wheel 72 through the medium of a cam member 76 rigidly secured to the said wiper 75, and adapted to successively engage the pins 77, 78, 79 and 80 upon the said ratchet wheel 72. The motor magnet 71 is provided with an armature 81 upon the end of which there is suitably secured a pawl 82. Each time that the said magnet is energized the pawl 82 engages the ratchet wheel 72, advancing the latter one step. It will be noticed, therefore, that as the ratchet wheel 72 advances the wiper 75 is moved step by step from right to left, and when the pin 77, for instance, clears the cam 76, the retracting spring 83 restores the wiper 75 to its first position at the right of the bank O and in engagement with the first segment 84. The said motor magnet 71 is provided with a couple of interrupter springs 85 and 86 that are included in the energizing circuit of the said motor magnet, which energizing circuit also comprises the springs 87 and 88 controlled by the differential relay 73. Therefore, whenever the differential relay 73 is energized the springs 87 and 88 are pressed into contact and the motor magnet 71 operates intermittently as long as the differential relay 73 remains energized. Furthermore, it is assumed that the terminal Q of the line switch C is the first terminal of the line switch bank. While the plunger 44 is in normal engagement with the shaft 60 it is retained in front of said terminal by the plunger shaft 60, whenever the master switch wiper 75 is in engagement with the bank segment 84; but as the motor magnet 71 advances the wiper 75 onto the second segment 89, the said plunger and all idle plungers similarly engaging the shaft 60 are carried opposite the next terminal of the line switch bank. The master switch bank O (Fig. 5) comprises the individual segments $a^3$ separated from the common segment 74 by the insulating strip 253. It will be seen that after the wiper 75 passes over the segments from right to left and engages the last segment 164, then on the next step the wiper 75 passes from the extreme left contact 164 to the contact 84 on the extreme right; but in passing from this extreme position to the other the upper part of the wiper 75 slides on the insulated member 254. This provision is made in order that the individual segments may not be brought into contact with the common segment 74, whereby some interference with the successful operation of the master switch might be experienced. It should be noted that in each switch bank all of the springs 63 are permanently connected and may be made of one common piece. The springs 64, however, are individual—that is, there is one separate and distinct spring for every terminal Q, there being ten in the bank. The springs 65, 67, 68 and 69, like the springs 63, are also common, and the springs 66 and 70, like the springs 64, are individual. For every bank terminal Q there is a trunk line of three conductors 90, 91 and 92 leading to a selector; and there is also a normal trunk line comprising the conductors 93, 94 and 95 leading to the connector banks. The subscriber's line conductors 31 and 32 terminate in the springs 63 and 65 which, as has been stated, are common springs. When the subscriber operates the line switch C, and the plunger 44 engages the terminal Q, the subscriber's line conductors 31 and 32 are extended to the vertical and rotary trunk conductors 90 and 91 and thence to the switch E.

The first-selector switch E is the same as the selector-switch disclosed in United States Letters Patent No. 815,321, granted March 13, 1906, to Keith, Erickson & Erickson, with the exception that there are no normal conductors, such as the normal conductors of the selector switch disclosed in said patent. There is also no necessity in the selector-switch E for a bridge-cut-off relay, and it is also omitted, and the line relays are connected directly to the battery lead. The private normal conductor is of no utility in connection with the selector-switch E, and is also omitted. The vertical magnet 96 and the rotary magnet 97, the release magnet 98 and the private magnet 99 will be recognized and understood. The said private magnet 99, of course, controls the side switch wipers 100, 101, 102, 103 and 104, the said private magnet also controlling the circuit of the vertical magnet 96 in the usual manner by means of the springs 105 and 106, but not the circuit of the release magnet, as the release magnet spring is omitted. The vertical movement of the switch-shaft, and therefore, of the wipers 119, 120 and 121, is controlled by the vertical magnet 96, and the rotary movement by the rotary magnet 97, the rotary magnet circuit being provided with the usual interrupter springs 107. The operative magnets of the switch are, of course, controlled by the subscriber through the medium of the vertical and rotary line relays 108 and 109, as is well known. Said relays have under their control the usual springs 110, 111 and 112, and in addition the unk-release springs 113 and 114, whereby the said switch may be released when the side switch wipers are in first or second position. By means of the back-release relay 115 the release of the switch E is brought about after the side switch has passed to third position. In addition, the said switch is provided with a normal arm 116 which, when the shaft is raised one step or more, permits the springs 117 and 118 to engage, whereby the rotary trunk conductor 91 becomes connected with the side switch wiper 101. The relay 122 operates to close a circuit through the lamp 39 when the side switch wiper 104 is in first position, and when the line switch bank springs 69 and 70 are in engagement.

The second-selector switch F is like the first-selector switch E, with two exceptions, namely the trunk-release spring 123 and the release relay spring 124, instead of being connected directly to ground, as in the selector E, are connected with the private trunk conductor. Furthermore, the second-selector F is provided with the resistance 255 by means of which the selector may be released from the jack 232 independently of the first-selector or connector switches.

The connector switch H may also be of any suitable or approved type, for instance of the general type described in United States Letters Patent No. 815,176, granted March 13, 1906, to Keith, Erickson & Erickson, and provided with certain improvements. The mechanical details of the first-selector and connector, as is well known, are very much the same, although there is material difference in the circuits. The connector switch shaft (not shown), like the first-selector switch shaft, carries the line wipers 125 and 126 and the private wiper 127. The connector-switch is also controlled by the calling subscriber through the medium of the vertical and rotary line relays 128 and 129. The vertical line relay 128 directly controls the vertical magnet 130 and also the rotary magnet 131 and the ringer relay 132. The office of the vertical magnet 130 is to give the shaft and shaft wipers their vertical motion, and the rotary magnet 131 imparts to the shaft and shaft wipers a rotary or circular motion. The rotary line relay controls the private magnet 133 which, under certain conditions, in turn controls the vertical and rotary magnets 130 and 131, the release magnet 134, and also the side switch wipers 135, 136, 137, 138 and 139. The side switch of the connector, like the side switch of the first-selector, has a normal or first position, a second position and a third position. The release magnet 134 is also controlled by the line relays 128 and 129 conjointly. By the condensers 140 and 141 the circuit through the connector is divided into two sections. The back relay 143 gives to the operator or wire-chief means whereby he may operate the connector switch to call in on a busy line. In addition, the connector switch H is provided with the relay 144 by means of which the condensers 140 and 141 may be short-circuited when it is desired to test-out on a line through the connector switch. The relay 145 operates to close a circuit through the lamp 42 when the connector trunk line conductors are seized. The relay 142 is provided for controlling the circuit of the signal lamp 132$^a$ which, when glowing, indicates to the exchange attendant that some connector switch of the group to which the said lamp is allotted failed to release when the second-selector was released. The connector switch shaft (not shown) is provided with the normal arm 140$^a$ which, when the shaft rises, permits the springs 141$^a$ and 142$^a$ to engage, whereby ground is supplied to the spring of relay 142. The central office is equipped with busy-signaling apparatus of any suitable design comprising an interrupter in series with the primary winding of the induction-coil as, for example, shown at K, whereby a busy-signaling current is induced in the secondary winding of the said coil.

A clearer understanding of the operation of my improved system may be obtained from its action when one subscriber calls another. Assume, for example, that the subscriber at substation A desires to call the subscriber at substation A' to which is allotted the line #2220.

To call the number 2220 the subscriber at substation A operates the calling device once, in the well-known manner, for each digit. The preliminary impulse for operating the line switch C occurs when the calling subscriber rotates the dial for the first digit, whereby the rotary impulse spring 24 is pressed against the ground post 20, as explained. As a result the trip magnet 47 of the line switch C is energized by a flow of current from ground G' to the springs 18 and 19, ground post 20, impulse spring 24 to the rotary line conductor 32, conductor 153, cut-off relay springs 154 and 155 to the trip magnet 47, thence through said trip magnet to the conductor 156, springs 157 and 158 of the relay 159 to the battery lead 160, thence through battery B to ground G. As soon as the trip magnet 47 energizes, the armature 51 is attracted, and the plunger 44 is liberated and thrust into the bank terminal Q by the spring 58. When the plunger 44 engages the bank terminal Q an energizing circuit is closed through the motor magnet relay 73, which in turn operates to close a circuit through the motor magnet 71. The motor magnet then operates to advance all of the idle plungers in locking engagement with the shaft 60 opposite the next idle bank terminal corresponding to the terminal Q. The circuit through the relay 73 extends from ground G² through the winding 161 of the relay 73, through the auxiliary relay 159, segment 74, wiper arm 75, segment 84, conductor 162, bank terminal springs 70 and 69, release magnet 48 to the battery lead 160, thence through battery B to ground G. Although this circuit includes the release magnet 48, the said magnet does not operatively energize, since the windings of the relay 73 are wound to a high resistance while the winding of the release magnet is comparatively low. The relay 73 upon energizing operates to place the springs 87 and 88 in contact, whereby a circuit is completed through the motor magnet 71. said circuit extending from ground G³ through the springs 88 and 87, motor magnet 71, springs 86 and 85 to the battery lead 160, thence through battery B to ground G. The motor magnet 71 upon energizing attracts its armature 81, whereby the pawl 82 engages the ratchet wheel 72 and rotates the said wheel one step. When the armature 81 is attracted against the magnet cores the springs 85 and 86 disengage, thereby breaking the energizing circuit through the motor magnet. The cam-arm 76 being in engagement with the pin 77 is operated to advance the plunger shaft 60, and consequently all idle plungers that may be in normal locked position, one step to another trunk terminal corresponding to the terminal Q. Also, the wiper 75 is carried from the contact point 84, which corresponds to the terminal Q, to the contact point 89, which latter corresponds to the terminal before which the advanced idle plungers are now resting. At the instant that the said plunger 44 enters the said bank terminal Q the following springs are pressed into contact: 63 and 64, 65 and 66, 67 and 68, and 69 and 70. The engagement of the springs 67 and 68 establishes a circuit from ground G⁴ by way of the normal conductor 95 to the connector private bank contacts corresponding to the line that terminates in the line switch C, whereby a guarding potential is set up to prevent any subscriber from calling the said line after the calling subscriber at substation A operates his dial preparatory to making a call, as explained. The circuit over which the said guarding potential is established extends from ground G⁴ through the bank springs 67 and 68, to the private normal conductor 95, thence to the connector private banks. The engagement of the springs 67 and 68 also closes a circuit through the cut-off relay 46, said circuit extending from ground G⁴ through the springs 67 and 68, conductor 163, relay 46 to the battery lead 160, thence through battery B to ground G. The said relay, upon energizing, breaks the contact between the springs 154 and 155, whereby the rotary line conductor 32 becomes disconnected from the trip magnet 47. The closure of connection between the springs 69 and 70 also establishes a guarding potential at the master switch bank contact 84 over the following circuit: from battery B to the battery lead 160, thence through the release magnet 48 and springs 69 and 70 over the conductor 162 to the said contact point 84. It will be understood that the bank terminal Q, being the first bank terminal of the line switch bank, corresponds to the first segment 84 of the master switch bank O. This guarding potential protects the seized trunk conductors 90, 91 and 92 from being seized by other plungers. Suppose that the master switch has operated and carried the wiper 75 to the last contact point 164. Now, when the motor magnet 71 operates for the next step, the wiper 75 engages the contact point 84 upon which there is a guarding potential. An energizing circuit is established through the differential relay 73, which in turn operates to close an energizing circuit through the motor magnet 71. The current through the said relay 73 flows from the said contact 84 through the wiper 75 to the common segment 74, relay 159, through the winding 161 of the differential relay 73 to ground G². When the differential relay 73 attracts its armature the differential relay springs 87 and 88 are pressed into contact, thereby closing an energizing circuit for the motor magnet 71 from ground G³ through the said springs 87 and 88, through the motor magnet 71, springs 86 and 85, thence to the battery lead 160, and through battery B to ground G. The motor magnet then operates, as previously explained, to rotate the ratchet wheel 72 one step for advancing the plunger shaft 60 one step, and the master switch bank wiper 75 one step also, into engagement with the second segment 89. The plunger shaft 60 when thus advanced one step carries all idle plungers that are in locking engagement with the said shaft opposite the next bank terminal, as previously explained. If there should be a guarding potential at the bank segment 89 of the master switch bank, the differential relay 73 will then remain energized, whereby the energizing circuit through the motor magnet 71 is again completed when the motor magnet springs 85 and 86 again engage. As a result the motor magnet 71 is again operated, whereby the plunger shaft 60 and the master switch wiper 75 are advanced another step. This process continues as long as the wiper 75 continues to find segments with guarding potentials. As soon as an idle segment is found, however, the energizing circuit through the differential relay 73 is broken, at which time the said relay in turn breaks the energizing circuit for the motor magnet 71 until the next subscriber makes a call. Furthermore, the closure in contact of the springs 69 and 70 completes an energizing circuit through the lamp relay 122 of the first-selector E, said circuit extending from ground $G^5$ through the lamp relay 122, to the side switch wiper 104, contact point 165, conductor 91, slow-acting release relay 166, bank springs 70 and 69, through the release magnet 48, to the battery lead 160, thence through battery B and to ground G. Though the release magnet 48 and slow-acting release relay 166 are included in this circuit, the said magnet and relay do not energize, since the lamp relay 122 is wound to a high resistance. The lamp relay 122 upon energizing closes the springs 167 and 168 in contact, whereby a circuit is closed through the signal lamp 39 extending from ground $G^5$ through the springs 167 and 168, through the lamp 39 to the conductor 169, and to the battery lead 160, thence through battery B and to ground G. The glowing of this lamp indicates to the exchange attendant that a first-selector of the group to which the lamp is allotted has been seized by a line switch. Furthermore, when the relay 122 energizes, the springs 146 and 147 are pressed into engagement, whereby the busy-signaling machine I is connected to the vertical line trunk conductor 90 through the side switch wiper 100. When the side switch wiper 104 passes to third position the lamp relay 122 deënergizes and the signal disappears. The closure of connection between the springs 63 and 64 extends the calling subscriber's vertical line conductor 31 to the vertical trunk conductor 90, and to the side switch wiper 100 of the first-selector E. The closure of contact between the springs 65 and 66 in a similar manner extends the subscriber's rotary line conductor 32 to the rotary trunk conductor 91. The subscriber has thus established connection with the selector E, and now when the dial returns to normal position the impulse springs are operated for the first digit.

The first digit being 2 the subscriber operates his dial accordingly, grounding the vertical line conductor 31 each time that the spring 23 is pressed onto the ground post 20. As a result the vertical line relay 108 of the first-selector E is energized by a flow of current from the substation ground $G'$ through the springs 18 and 19 to the ground post 20, thence through the spring 23 to the vertical line conductor 31, line switch bank springs 63 and 64, vertical trunk conductor 90, side switch wiper 100 of the selector E, contact point 170, vertical line relay 108 to the battery lead 160, thence through battery B and to ground G. Each time that the vertical line relay 108 energizes, the line relay spring 111 is pressed onto the ground spring 110. The vertical magnet 96 is thereby energized, and the wipers 119, 120 and 121 of the selector E are raised to the second bank level and to a point opposite the first contact of said level. The energizing circuit for the said vertical magnet 96 extends from ground $G^7$ through the springs 110 and 111, private springs 105 and 106 to the vertical magnet 96, thence to the battery lead 160, and through battery B to ground G. The spring 24 is then pressed onto the ground post 20, grounding the rotary line conductor 32 and energizing, therefore, the rotary line relay 109 of the selector E. The energizing current passes from ground $G'$ to the rotary line conductor 32, thence it flows through the line switch bank springs 65 and 66, rotary trunk conductor 91, normal springs 117 and 118, side switch wiper 101 of the selector E, contact point 171 to the rotary line relay 109, thence to the battery lead 160, and through battery B to ground G. The rotary line relay upon operating presses the line relay spring 112 onto the ground spring 110, thereby establishing a circuit through the private magnet 99 from ground $G^7$ through the springs 110 and 112 to the private magnet 99, and through the said magnet to battery lead 160, thence through battery B to ground G. The private magnet upon energizing and deënergizing permits the selector side switch to pass from first to second position, permitting the side switch-wipers 102 and 103 to engage the contact points 172 and 173, respectively. The closure of connection between the side switch wiper 102 and the contact point 172 sets up an energizing circuit for the rotary magnet 97 from ground $G^8$ to the contact point 172, through the side switch wiper 102, interrupter spring 107, rotary magnet 97 to the battery lead 160, and then through battery B to ground G. The said rotary magnet 97 then operates to rotate the wipers 119, 120 and 121 of the selector E into engagement with a trunk line leading to some idle second-selector switch, and in the particular case under consideration to the selector-switch F. If the wipers have to pass over busy trunk lines, then as soon as the private wiper 121 engages a grounded contact point the private magnet 99 energizes again, locking the side switch in second position. The energizing circuit for said private magnet extends from the grounded terminal G of battery B through an occupying switch (not shown) to the private wiper 121, thence over the conductor 174 and through the back-release relay 115 to the side switch wiper 103, contact point 173, private magnet 99, thence through said magnet to the battery lead 160, and through battery B to ground G. The private magnet 99 upon thus becoming energized locks the side switch wiper 102 in engagement with the grounded contact point 172, whereby the rotary magnet 97 will be energized step by step until the wipers are carried beyond the last busy trunk line. At the instant that the private wiper leaves the last busy contact point the energizing circuit through the private magnet 99 is destroyed, and as a result the selector side switch passes to third position. If, however, there are no busy trunk lines, the rotary magnet 97 releases the side switch to third position as soon as the wipers are carried into engagement with the first trunk line. As soon as the side switch passes to third position, as stated, the subscriber's line conductors 31 and 32 are extended to the conductors 175 and 176, which in this case it is assumed lead to the selector-switch F. The extension of the line occurs, of course, as soon as the side switch wipers 100 and 101 engage the contact points 177 and 178, respectively. Not only is the subscriber's line thus extended, but a guarding potential is also established at the private wiper 121, when the side switch wiper 103 passes onto the ground contact point 179, for protecting the seized trunk line against interference by other calling subscribers. This guarding potential is established from ground $G^9$ to the contact point 179, thence through the side switch wiper 103 and through the back-release relay 115, conductor 174 to the private wiper 121. It will be necessary, of course, that the energizing circuit for the rotary magnet 97, to which reference has already been made, be destroyed when the idle trunk line is seized. This occurs when the side switch wiper 102 leaves the contact point 172. Also, when the side switch wiper 103 passes to third position in contact with the contact point 179 an energizing circuit is established through the lamp relay 180 of the selector F, extending from ground $G^9$ through the side switch wiper 103, back-release relay 115, conductor 174, shaft wiper 121, conductor 181, side switch wiper 182, lamp relay 180 to the battery lead 160, thence through battery B and to ground G. The relay upon energizing operates to close in contact the springs 183 and 184 and the springs 185 and 186. The engagement of the springs 183 and 184 closes a circuit through the group lamp 41. The glowing of the said lamp indicates to the exchange attendant that some selector-switch of the group to which selector F belongs has been seized. The lamp continues to glow as long as any of its group selectors are seized and the side switch remains in first position. The engagement of the springs 185 and 186 reconnects the busy-signaling machine J with the trunk conductor 175, through the side switch wiper 187. The second digit of the number called being 2, the calling subscriber again operates his dial accordingly, as a result grounding the vertical line conductor 31 when the spring 23 meets the ground post 20. The vertical line relay 188 of the switch F is, therefore, energized twice by a flow of current from the substation ground G' to the vertical line conductor 31, thence through the line switch bank springs 63 and 64 to the vertical trunk conductor 90, thence to the side switch wiper 100 of the selector E, contact point 177, vertical line wiper 119, vertical trunk conductor 175, side switch wiper 187, vertical line relay 188 to the battery lead 160, thence through battery B to ground G. The selector switch F is operated for the second digit 2 in the same manner in which the first-selector E was operated for the first digit. After the switch F comes to rest its shaft wipers 189, 190 and 191 are in engagement with the trunk conductors 192, 193 and 194, respectively, which lead to the connector H. An energizing circuit is established through the lamp relay 145, which operates to close in contact the springs 148 and 149, and 150 and 151. The relay 145 performs the same functions with respect to the trunk conductors 192 and 193 that the relays 180 and 122 perform in connection with their respective trunk lines—that is, when the springs 148 and 149 are pressed into contact the lamp 42 is lighted by a flow of current from ground $G^{12}$ to said lamp. At the same time the closure of contact between the springs 150 and 151 puts a busy-signal directly on the vertical trunk conductor 192. Furthermore, when the side switch wiper 244 of the selector F passes to third position an energizing circuit is closed through the relay 142 of the connector H. This circuit extends from ground $G^{11}$ through the side switch wiper 244, release relay 213, private shaft wiper 191, conductor 194, through the winding of the relay 142 to the battery lead 160, and through battery B to ground G. When the side switch wiper 139 passes to second position the energizing circuit through the lamp relay 145 remains unbroken; but when the side switch passes to third position a circuit is closed through the lamp 43. The glowing of this lamp indicates to the exchange attendant that a connector of the group to which the lamp is allotted has operated and established connection with some line. The ground impulses from the substation to the line conductors for the last two digits—namely the third and fourth—are directed toward the connector H. For the third digit 2 the vertical impulse spring 23 is pressed onto the ground post 20 twice, whereby an energizing circuit is closed through the vertical line relay 128. This circuit extends from ground G' through the ground post 20, spring 23, line conductor 31, springs 63 and 64, trunk conductors 90, 175 and 192, springs 195 and 196, vertical line relay 128 to the battery lead 160, thence through battery B to ground G. Each time that the vertical line relay 128 is energized the line relay springs 197 and 198 are pressed into contact, thereby closing an energizing circuit each time through the vertical magnet 130 which operates in the usual manner one step at a time. The shaft wipers 125, 126 and 127 are, therefore, raised two steps opposite the level in which are located the normal terminals of the line #2220. The rotary impulse spring 24 makes contact with the ground post 20, thereby closing an energizing circuit through the rotary line relay 129 extending from ground G' through the ground post 20 and spring 24, line conductor 32, trunk conductors 91, 176 and 193, springs 199 and 200, through the rotary line relay 129 to the battery lead 160, thence through battery B to ground G. The rotary line relay upon operating closes an energizing circuit through the private magnet 133, which operates to release the connector side switch from first to second position. The last digit being 0 the calling device is operated, as previously described, grounding the vertical line conductor 31 ten times and the rotary line conductor 32 once. The vertical and rotary line relays 128 and 129 are operated over previously traced circuits. However, when the line relay springs 197 and 198 engage, a circuit is closed through the rotary magnet 131 instead of through the vertical magnet 130. Each time that the rotary magnet 131 is energized it operates to rotate the shaft and shaft wipers 125, 126 and 127 one step at a time until the said wipers are carried into engagement with the normal conductors 201, 202 and 203, the former two of which lead to the line terminals of the desired subscriber. The energizing of the rotary line relay 129, as previously stated, completes an energizing circuit through the private magnet 133 which now operates to release the side switch from second to third position, thus placing the side switch wipers 135, 136, 137, 138 and 139 in contact with their respective contact points. Furthermore, when the side switch wiper 137 engages the contact point 204 a guarding potential is established for protecting the called line. This potential extends from ground $G^{10}$ to the contact point 204, side switch wiper 137, springs 268 and 269, private wiper 127 which engages the private contact of the called line. The engagement of the contact point 204 by the side switch wiper 137 also closes an energizing circuit through the bridge-cut-off relay 205 of the line switch C'. The line conductors 206 and 207 of the substation #2220 are now connected to the calling substation. To signal the called subscriber the calling subscriber presses the button 37, whereby the spring 35 is pressed into engagement with the ground spring 38, whereby an energizing circuit is established through the connector vertical line relay 128. The said relay 128 now operates to close an energizing circuit through the ringer relay 132, which operates in the usual manner to bridge the ringer generator L across the line conductors 206 and 207 to operate the ringer 208 at substation A'. The subscriber at substation A', upon removing the receiver 209 from the switch-hook 210, may converse with the subscriber at substation A over the circuit shown by the heavy lines in Figs. 1 and 2.

The release of the central office switching apparatus occurs when the calling subscriber restores the receiver 2 to the switch-hook 3, thereby pressing the release springs 7, 8 and 9 into engagement for a moment. The contact of the said release springs grounds the vertical and rotary line conductors 31 and 32 simultaneously from ground G' to the release spring 7, thence through the springs 8 and 9 to the vertical and rotary line conductors, thereby simultaneously energizing the vertical and rotary line relays 128 and 129, whereby the release relay 213 of the selector F is energized in series with the release magnet 134 of the connector H. The circuit extends from ground $G^{11}$ to the side switch wiper 244, release relay 213 selector shaft wiper 191, connector release springs 211 and 212, release magnet 134 to the battery lead 160, thence through battery B to ground G. When the connector release magnet 134 is thus supplied with current it energizes, and as a result the switch shaft and side switch are restored to normal position, thus breaking the connection between the connector switch shaft wipers 125, 126 and 127 and the normal conductors 201, 202 and 203. The back-release relay 218 of the selector F being in the same circuit with the release magnet 134 energizes simultaneously with the latter and presses the springs 124, 214 and 256 into engagement, which in turn close an energizing circuit through the release relay 115 of the first-selector E and resistance-coil 255 of the selector F in series with the release magnet 215 of the selector F. This circuit extends from ground $G^9$ through the release relay 115, shaft wiper 121, springs 124 and 214, through the winding of the release magnet 215 to the battery lead 160, thence through battery B to ground G. In a similar manner the relay 115 upon energizing closes in contact the springs 216 and 217, whereby the release magnet 98 of the first-selector becomes energized. Also, when the rotary line conductor 32 is grounded an energizing circuit is established through the release relay 166 of the line switch C. This circuit extends from the substation ground G' through the release springs 7, 8 and 9 to the rotary line conductor 32, bank springs 65 and 66, relay 166, conductor 92, bank springs 70 and 69, release magnet 48 to the battery lead 160, thence through battery B to ground G. The relay 166 being a high wound coil does not allow enough current to flow to operatively energize the release magnet 48, but when the relay 166 energizes and places the springs 218 and 219 in contact, while the vertical line conductor 31 is grounded, then the said release magnet 48 is connected directly to ground and operatively energized. The path of this energizing circuit extends from the substation ground G' through the release springs 7 and 8, vertical conductor 31, bank springs 63 and 64, relay springs 219 and 218, conductor 92, bank springs 70 and 69, through the release magnet 48 to the battery lead 160, thence through battery B to ground G. All of the relays and magnets thus energized attract their respective armatures, and remain in readiness to release the apparatus they control, and as soon as the substation release springs 7, 8 and 9 separate and break the ground connection with the line conductors 31 and 32, they then deënergize. The calling subscriber thus restores all switching apparatus which he originally brought into use. It has been shown how the central office switches may be operated in the usual manner to establish a connection and then released.

Having described the apparatus and the method by which one subscriber obtains connection with another, and the method and means by which the calling subscriber releases or restores the switching apparatus after a call is made, I will now proceed more directly to point out the use of the supervisory apparatus shown at $a$, $a'$ and $a^2$ (Fig. 3) in connection with this system. This supervisory apparatus plays a very important part not only while the subscribers are calling, but at all times, and by means of it the central office is kept informed of the condition of the switches, as to whether they are in trouble or not. Furthermore, through the medium of this apparatus the switches may be restored to their normal condition without the attendant having to hunt up the particular switch that is in trouble. If for any reason, when the calling subscriber hangs up his receiver and releases, all the switches are restored to normal position except the second-selector switch F, for example, the line wipers 189, 190 and 191 of the said switch F will remain connected with the trunk line leading to the connector H, and the side switch of said selector F will remain in third position. It will be evident, then, that as soon as the connector side switch wiper 139 passes to first position the energizing circuit for the supervisory relay 145 is again established, taking ground potential from ground $G^{11}$ at the selector F. Said relay 145 upon energizing again operates to close the springs 148 and 149 in contact, and at the same time close the springs 150 and 151 in contact. The springs 148 and 149 upon engagement close a circuit through the lamp 42 extending from ground $G^{12}$, through the springs 148 and 149, lamp 42 to the battery lead 160, thence through battery B and to ground G. The engagement of the springs 150 and 151 closes a circuit extending from the busy-signaling machine K to the vertical trunk conductor 192. The glowing of the lamp 42 indicates to the exchange attendant that some connector trunk line of the group to which the lamp 42 is allotted is seized, and the allotted connector remains in an idle position. To determine which trunk line is thus occupied the attendant operates the key $b$ to close the springs 220 and 221 in contact, and the key $c$ is also operated to close the springs 222 and 223 in contact. The tip 224 of the plug is then placed in successive contact with the different jacks of the group $a^2$ (Fig. 3) until the jack 225 which is allotted to the line conductors 192 and 193 is reached. When the tip 224 comes in contact with this jack a busy-signaling current will be transmitted through the receiver 226. The path of this current extends from the battery lead 160 at the key $b$ through the springs 220 and 221, resistance-coil $m$, receiver 226, calling device $d$, springs 223 and 222 to the tip 224, conductor 227, vertical trunk line conductor 192, relay springs 150 and 151, through the winding 228, thence to the battery lead 160. The attendant thus selects from the group the trunk line which is in trouble. As shown, a resistance-coil is introduced in the circuit between the spring 221 of the key $b$ and the receiver 226. The object of this resistance is to cut down the current, so that if the tip 224 of the plug $n$ should accidentally come in contact with the lower ring spring of the jacks, the release relay 213 of the selector F, and similar relays of all other selectors in the same group, may not be energized while the operator is hunting for the line in trouble. This coil $m$ may be of any suitable resistance, as, for example, five thousand ohms. The operator then, in order to restore the selector, first restores the key $b$ to normal position, and then reverses the key $c$, inserting at the same time the plug $n$ into the jack $o$. By the reversal of the key $c$ the springs 222 and 223 are separated, and the springs 229, 230 and 231 are carried into contact. By the engagement of the springs 229, 230 and 231 the trunk line conductors 192 and 193 are grounded simultaneously, and the connector vertical and rotary line relays 128 and 129 are energized simultaneously, whereby the springs 211 and 212 are placed in contact, thus closing an energizing circuit through the release relay 213 of the selector F in series with the release magnet 134 of the connector H. When the release relay 213 energizes, the springs 214, 124 and 256 are then pressed into contact, whereby an energizing circuit is closed through the release magnet 215 of the selector F. This circuit extends from ground through the resistance-coil 255 and springs 256, 124 and 214, then through the winding of the release magnet 215 to the battery lead 160, and through battery B to ground G. The magnets of the selector F and connector H energize and operate, as previously explained, to bring about the release of the switches H and F. Of course, if the selector F persists in not releasing, then it is evident that there is some defect in the releasing mechanism or circuits of the said switch, and in that case the attendant must, of course, find the switch itself. If it is assumed that instead of the selector F failing to release the selector E fails to release, the wipers and side switch of which remain in operated position, as shown, in Fig. 1, then instead of the lamp 42 being lighted, the lamp 41 is lighted by the reëstablishment of the energizing circuit through the relay 180, said circuit extending from ground $G^9$, side switch wiper 103, release relay 115, conductor 174, shaft wiper 121, switch wiper 182, relay 180 to the battery lead 160, thence through battery B and to ground G. The said relay energizes and places in contact the springs 183 and 184 and 185 and 186. The engagement of the springs 183 and 184 closes a circuit through the lamp 41, which circuit extends from ground $G^{14}$ through the springs 183 and 184, through the lamp 41 to the battery lead 160, thence through battery B and to ground G. The engagement of the springs 185 and 186 connects the busy-signaling machine J with the vertical trunk conductor 175 through the side switch wiper 187. The attendant noticing the glowing of the lamp 41 operates the keys $b$ and $c$ as before, and places the tip 224 of the plug in contact with the successive jacks in the group $a'$, and when the said tip engages the jack 232 which is allotted to the trunk conductors 175 and 176 a busy-signaling current will pass from the machine J through the receiver 226. The attendant is thus able to select from the group of trunk lines the particular trunk which is occupied. The plug may be inserted in the jack 232 and the key $c$ operated to ground both trunk conductors as before, whereby the release of the first-selector switch may be brought about—that is, by oprating the key $c$ after the plug $n$ has been inserted in the proper jack of the trunk line leading to the selector F (namely the jack 232), the trunk conductors 175 and 176 are grounded simultaneously, and, of course, the line relays 188 and 238 energize simultaneously, pressing the trunk-release springs 123 and 239 into contact and thus establishing an energizing circuit through the release magnet 215 of the selector F and back-release relay 115 of the selector E. Energizing the back-release relay 115 of the said selector E presses the springs 216 and 217 into contact, whereby the release magnet 98 is energized, which magnet, upon deënergizing, restores the selector switch, as is well known. This occurs at the instant that the operator restores the key $c$ to normal condition, and permits the springs 229, 230 and 231 to separate. Just as it has been assumed that the selectors F or E may fail to release, it may be assumed that the individual switch C may fail to release, in which case the said switch will be left tripped after the selector E is restored to normal condition, with the side switch in first position; or instead of assuming that the individual switch C has failed to release, it may be assumed that a temporary grounding of the rotary line conductor 32 has tripped the individual switch C, and nothing more. In either case the supervisory relay 122 of the switch E will be energized and will operate to close a circuit through the group lamp 39, and to connect the busy-signaling machine I with the vertical trunk conductor 90 through the side switch wiper 100. From the group $a$ the attendant is able to select the jack 40 which is allotted to the trunk conductors 90 and 91. The plug may then be inserted into the jack 40, and the vertical and rotary trunk conductors 90 and 91 grounded simultaneously, as previously explained. The ground potential to the rotary trunk conductor 91 causes the release relay 166 to become energized, which relay operates as before to place the release magnet 48 in connection with the grounded vertical trunk conductor 90. The release magnet being thus supplied with an energizing current operates and remains in readiness to release the switch C when the ground connection to the trunk conductors 90 and 91 is broken.

In the preceding description of how one subscriber may call another, nothing has been said as to the mode of operation when one subscriber attempts to establish connection with a busy subscriber. In case the desired subscriber is busy, for reasons already explained, the private normal of said busy subscriber is grounded to protect him from intrusion. For example, if the line of the subscriber $A'$ is busy, either because he is making a call or because someone has called him, the private normal conductor 203 is connected to ground—in the one case to ground $G^{15}$ through the bank springs 240 and 241, and in the last case to ground $G^{10}$ of the connector that has established connection with his line. In any event, when a subscriber energizes the rotary line relay for the last digit, to throw the side switch of any connector H, for example, from second to third position to establish connection with a desired line, after the private wiper 127 has engaged a grounded private normal conductor, such as the private normal conductor 149

203, the private magnet 133, upon energizing and closing the private springs 242 and 243 in contact, will establish an energizing circuit through the release magnet 134 of the connector which will release the said connector and restore the side switch to first position. This, of course, occurs at the instant that the last rotary impulse is sent into the connector H. The connector having been thus released, then when the calling subscriber grounds his vertical line conductor 31 to signal, as already explained, instead of energizing the ringer relay 132 he will simply raise the shaft of the connector without accomplishing his signaling, and upon listening for an answer will receive a busy-signal from the same busy machine K that furnishes the signaling current for the operator when testing for an off-normal selector F, as already explained. The busy-signaling circuit will, of course, extend from the coil 228 to the vertical trunk conductor 192, thence through the substation and back through the rotary line relay 129 of the connector H to the coil 228. Of course, it will be understood that since the connector side switch is in first position the supervisory relay 145 of the connector is energized. Upon receiving the busy-signal the calling subscriber will hang up his receiver, ground both line conductors, and cause the energization of the connector line relays 128 and 129, which will cause the immediate release of the connector switch H. The grounding of the said line conductors 31 and 32 will at the same time cause the energization of the slow-acting release relay 166 of the line switch C, which will in turn close a circuit whereby the release magnet 48 is energized; then when the ground to the line conductors is removed the remaining switches will be released, as already explained. It will be evident that whenever the lamp 43 is displayed it will indicate to the trouble operator or switchboard attendant that two subscribers' lines are connected. When the lamp 43 is not displayed the inference will be that there is no second-selector F connected with a connector H, the side switch of which connector is in third position. When the lamp 43 is not lighted, however, the trouble operator or switchboard attendant may test for connectors that have not released—that is, for connectors which, after a connection has been established, have failed to release when the calling subscriber has restored his receiver to his switch-hook. It will be evident that if all the switches C, E and F are released, and the connector switch left with its side switch in third position, the lamp 43 will not be lighted to indicate to the operator that such is the case. In the event that the connector switch does not release after the second-selector has been released, the relay 142 deënergizes, since its energizing circuit is broken when the private shaft wiper 191 leaves the private trunk conductor 194. Therefore, the springs 260 and 261 engage, whereby a circuit is closed through the signal lamp 132ª. This circuit extends from ground G¹⁶ through the normal springs 142ª and 141ª, springs 260 and 261, spring 262, common strip 263, through the lamp 132ª to the battery lead 160, and through battery B to ground G. The glowing of the lamp 132ª indicates that a connector of this group is in an off-normal position. To determine which particular connector has been left off-normal the attendant pulls the button 264, whereby the common strip 263 is separated from the springs 262, 265, 266, etc. The tip of the plug $n$ is then so placed that the spring 266 and common strip 263 are brought into electrical contact. This is continued with each spring 265, etc., and when the spring 262 is thus engaged by the plug $n$ the circuit is again closed through the lamp 132ª, thus flashing the lamp and indicating to the attendant that the connector which is allotted to the spring 262 is the one which is off-normal. Then in order to release the connector the plug $n$ is inserted in the jack $o$, and the key $e$ is thrown so as to press the springs 229, 230 and 231 into contact, and the key $e$ is thrown so as to press the springs that it controls into contact, thereby placing a ground on the trunk-release conductor 194. As a result the line relays 128 and 129 will energize simultaneously, and the trunk-release springs 211 and 212 will be brought into contact, thereby establishing an energizing circuit for the release magnet 134, the circuit terminating at the ground terminal controlled by the key $e$; then when the key $e$ is restored, the ground is removed from the private bank and the connector switch is restored. In this way a wire-chief's or trouble-operator's board may be equipped in a district automatic exchange system, which operator or wire-chief will have within his reach and within his sight apparatus for supervising all trunks in the exchange or system. He can at once tell the condition of all switches, and if line switches such as the switches C or C' at the sub-central offices are accidentally tripped, he may then restore them at once without having to send a trouble-man to the sub-central. It will be evident, furthermore, that in a case where two or more switches are left connected together and unreleased, the wire-chief or trouble-operator may by the same means restore all such switches in the usual manner. For example, if the subscriber at substation A in making a call succeeds in operating the individual switch C, the first-selector E and the second-selector F and then fails to release the switches, the lamp 42 of the column $a^2$ (Fig. 3) will be left lighted. Then the operator, by inserting the plug into the jack of the trunk leading from the selector F to the connector H, and by operating the proper keys under his control, as already explained, will cause the release of the selector E, and will at the same time cause the release of the individual switch C as a result of grounding the trunk conductors 192 and 193 simultaneously, which, of course, under the conditions assumed, are in direct connection with the trunk conductors 90 and 91 which terminate in the line switch bank springs 64 and 66. It should be further understood that the various busy machines I, J and K may be made to give busy-signals of different character. For example, the busy machine I may be made to operate to give signals at regular periods, as, for example, one every second. The busy machine J may be made to give two busy-sound impulses at regular intervals, while the machine K may be made to give three at regular intervals, and so on. Then the trouble operator or wire-chief, by running the plug $n$ down the column of jacks $a$ and stopping on the jack 40, may find the busy signals corresponding to the machine J. In that event he will understand that the trunk to which the jack 40 is connected has been extended through to the selector F and is in connection with the jack 232, if the connection is in the order shown in Fig. 1, or with some other jack in the row $a'$, if some other second-selector of the group of selectors F has been selected by the first-selector E. In order to release the switches in that case he would not plug into the jack 40, but would plug into the jack 232, or whatever jack in that row may be the proper one. The proper one is, of course, discovered by running down the row $a'$ until the proper busy signal is found. It may be that upon listening-in on the jack 40 the trouble-chief may hear the busy-signal of the machine K, in which case he will search in the column $a^2$ for the trunk line in trouble before releasing.

The connector H, in addition to being used as a connector for completing calls in the usual way, may be used as a test connector—that is, the attendant may operate the said connector from the calling device $d$ to establish connection with any desired line, and after the connection is made the relay 144 may be operated by the key $b$ to close a metallic circuit or shunt across the terminals of the condensers 140 and 141. The keys $k$ may then be operated to bring about any desired test upon the line with which the switch H is in connection. To operate the said connector from the calling device $d$ the plug is inserted in the jack 225 and the key $e$ is operated to place a guarding potential upon the private conductor 194. The key $c$ may then be operated to place the calling device in connection with the conductors 192 and 193. After the calling device has been suitably operated, the key $b$ is operated to close the springs 233 and 234 in contact, whereby a circuit is established extending from ground $G^{18}$ through the springs 233 and 234, conductor 235, relay 144 to the battery lead 160, thence through battery B to ground G. The said relay, upon energizing, operates to shift the springs 195 and 199 out of engagement with the springs 196 and 200 and into engagement with the springs 236 and 237, respectively. This results in short-circuiting the condensers 140 and 141, so that the desired test may be made. The release of the connector may be brought about by operating the key $c$ so that the springs 229 and 230 are brought into connection with the ground spring 231, whereby both line conductors 192 and 193 are grounded simultaneously. This occurs, after the key $b$ has been restored. Furthermore, the connector H is provided with the relay 143, whereby the attendant or wire-chief may call-in on a busy line. Suppose that it is desired, for any reason, to call-in on a line that is busy—that is, a line which is protected by a guarding potential. In that event, the attendant operates the key $b'$ to close in contact the springs 246 and 245, whereby an energizing circuit is closed through the relay 143, said circuit extending from ground $G^{17}$ through the springs 245 and 246, conductor 267, through the relay 143 to the battery lead 160, thence through battery B to ground G. The said relay, upon energizing, operates to disengage the springs 268 and 269, whereby the private shaft wiper 127 is disconnected from the side switch wiper 137. Now, when the shaft wiper 127 engages a contact point upon which there is a guarding potential the connector is not given the so-called busy-release, for the protecting potential is not transmitted to the release magnet 134 when the private magnet 133 energizes on the last rotary impulse. Thus, by means of the connector H, the attendant may establish connection with a line when it is protected by a guarding potential. To do so he would take the precaution to throw the key $b'$ while he is making a call, so that when the last rotary impulse is delivered the circuit that would ordinarily cause the busy-release of the connector is then interrupted at a point between the springs 268 and 269 of the relay 143. But when the connector is used in the ordinary way by any subscriber of the exchange to which the connector is allotted, the said connector operates in the usual way—that is, if the private wiper 127 has been previously rotated into engagement with a busy line, then when the last rotary impulse is delivered, and the private magnet carries the private springs 242 and 243 into engagement, the potential that protects the busy line causes current to flow from the busy contact through the private wiper, through the relay springs 269 and 268, side switch wiper 137 in second position, private springs 242 and 243, winding of the release magnet 134, and through said magnet to the battery lead 160, thence through battery B to ground G. The release magnet then upon energizing deprives the switch shaft of its support and restores the side switch to first position, which operation breaks the established energizing circuit for the release magnet, restoring the connector to normal condition. The aforesaid means for preventing the busy-release, and the means for establishing a metallic circuit from the calling to the called side, around the condensers 140 and 141, are all under the supervision of the attendant. The drawings show supervisory apparatus for trunk lines between the sub-central to which the individual switch C belongs and the first-selector switches in which the said trunk lines terminate. Also, for the trunk lines from a certain level between the first-selectors of the group to which the first-selector E belongs and the second-selectors of the group to which the second-selector F belongs; also, for the trunk lines running from a certain level of the second-selectors of the group to which the second-selector F belongs, and connectors of the group to which the connector H belongs. But it is to be understood that every set of trunk lines between each sub-central and its allotted first-selectors, or between any group of individual switches and the allotted first-selectors, is provided with a group of jacks similar to the jacks $a$. Furthermore, every first-selector bank level in the exchange is provided with a group of jacks similar to the jacks $a'$, and every second-selector bank level in the exchange is provided with a row of jacks similar to the row $a^2$. Furthermore, it will be evident that a subscriber in calling from the group to which the subscriber A belongs may make a call in which he will employ a trunk line having a jack always in the group or row $a$ shown in Fig. 1; but thereafter he may make connection with a trunk line the jack of which may be either in the row $a'$ shown in Fig. 1, or in some other row $a'$ of a group of jacks, depending upon the level to which the wipers of the first-selector are raised. Having established connection with a second-selector he will then establish connection with a trunk line the jack of which may be located in any row $a^2$, depending upon the level to which the wipers of the selector may be raised. Although the calling device shown at $d$ is represented as comprising a couple of push-buttons and suitable springs controlled thereby, it will be understood that any form of calling device may be employed. The calling mechanism may, if desired, be the same as that employed at the substations A or A'.

In the system the resistance of the relays may be varied to any suitable degree. For example, the release magnet 48 of the individual switch C may be of sixty ohms; the slow-acting release relay 166 may be made five hundred ohms; the supervisory relay 122 as well as the supervisory relay 180 of the selector F and the supervisory relay 145 of the connector H may be five hundred ohms each; the resistance-coil 255 of the selector F may be wound to a resistance of five ohms.

Figure 13:
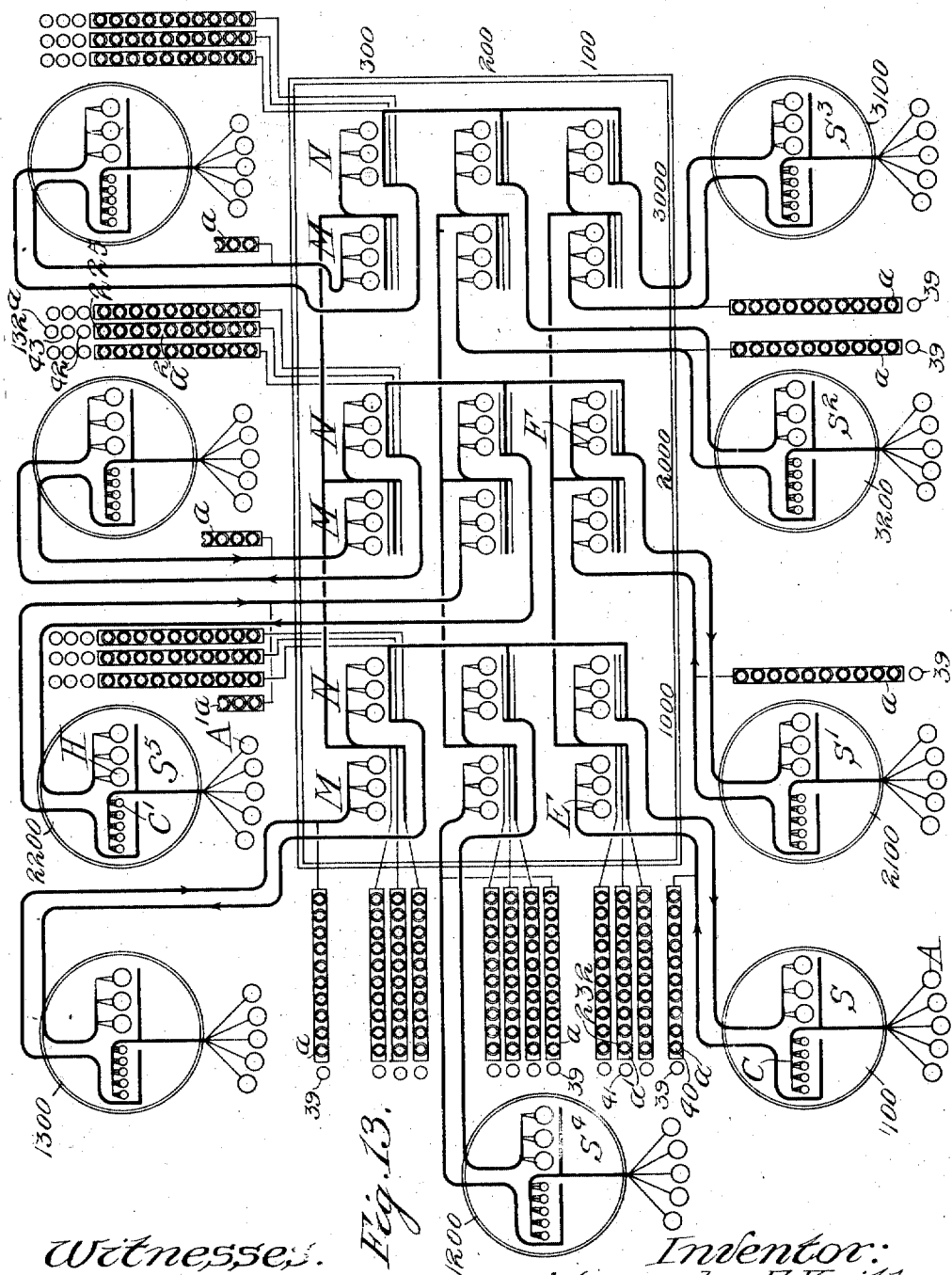
Fig. 13 represents diagrammatically a district automatic exchange system.

Fig. 13 shows diagrammatically part of a ten thousand district automatic exchange system with the supervisory jacks and lamps. From the left of the drawing to the right there are shown the one, two and three thousand groups, and from bottom to top the thousand-groups are divided into the one, two and three hundred groups. S, S¹, S², S³, etc., represent the different sub-centrals allotted to the different hundreds—that is S is the sub-central for the one-thousand one hundred group, S¹ for the two thousand one hundred group, S² for the three thousand two hundred group, S⁵ for the two thousand two hundred group, etc., as shown. The first-selector switches are, as shown, arranged in the vertical groups M, and the second-selector switches are arranged in the vertical groups N, while the individual switches and the connectors are placed at the sub-centrals S, S¹, S², etc. The sub-station A, as shown, is also a substation of the sub-central S, and its allotted line switch is shown at C. It will be seen that each outgoing set of trunk lines from the sub-central S has allotted to it a strip of jacks $a$ and a strip lamp 39. To the different first-selector bank-leads, of the hundred-groups there is also allotted a strip of jacks $a'$ and a supervisory lamp 41. In the calling operation described, the first-selector E is operated by the subscriber at substation A to select a trunk line of the second level, which leads to a second-selector F of the two-thousand group. The second-selector F is in turn operated to select a trunk line leading to a two-hundred connector in the two-thousand-group, in which group the substation A' is found. To each bank level of the second-selectors of each one-thousand-group there is allotted a strip of jacks $a^2$ and three signal lamps 42, 43, and 132ᵃ. Therefore, to each set of trunk lines leading to the sub-central S⁵ there is the strip of jacks $a^2$ and the lamps 132ᵃ, 43 and 42. Thus it will be seen that to each incoming set of trunk lines from a sub-central there is allotted a set of jacks and a group lamp. Similarly for each set of outgoing trunks to the sub-centrals there is a set of jacks and three signal lamps. Also, each first-selector bank level of the different hundred-groups is provided with a set of jacks and a common supervisory lamp. In this way supervision may be had over any call in the system, in a manner similar to that explained in connection with substations A and A'.

Figure 14:
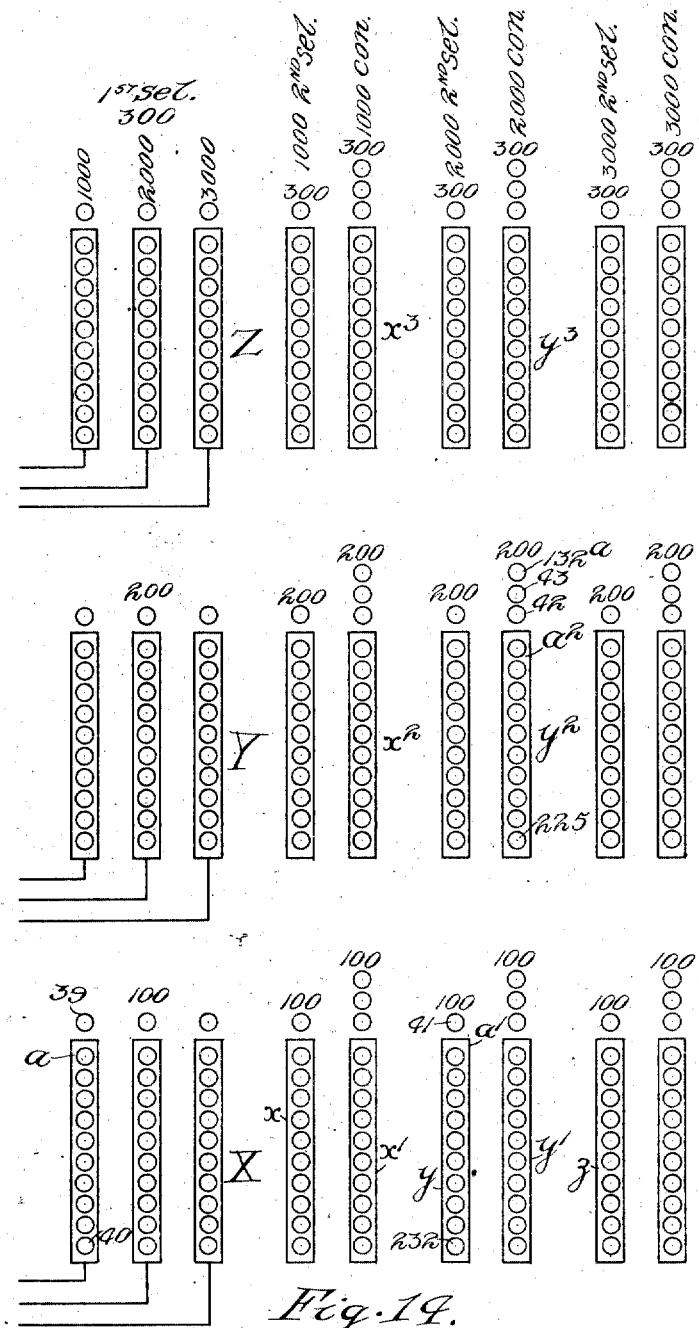
Fig. 14 represents diagrammatically an arrangement of the strips of jacks $a$, $a'$ and $a^2$ shown in Figs. 1 and 2.

In the foregoing nothing has been suggested as to the possible arrangement of the strips $a$, $a'$ and $a^2$ at the trouble operator's board. A number of arrangements may be resorted to that will work satisfactorily. However, in Fig. 14 is shown an arrangement of the strips for the section of the exchange shown in Fig. 13. At the left, in the column headed "1st sel.", are shown three sets of strips. These sets, reading from the bottom up, comprise in the first group the strips of the one-hundred selectors of the several thousands and are marked "100"; a second group comprises the strips of the two-hundred second-selectors which is marked "200"; and the third group comprises the three-hundred second-selectors and is marked "300." It will be seen that the strips in these various groups, reading from left to right, fall under the one, two and three thousand columns, as indicated at the top, thus indicating the hundred and thousand of the selector-group to which the strip belongs. For example, the strip $a$, shown in Fig. 3, will be found in the one-hundred-group on the left-hand side, indicating that the said strip $a$ belongs to the first-selectors of the one thousand one hundred or eleven-hundred group. To the right of the first-selectors and under the column marked "1000 2nd sel.", reading upward, are arranged the second-selectors of the first, second and third hundreds in the first thousand, and they are marked "100," "200" and "300," respectively. Immediately to the right of said selectors, under the column marked "1000 con.," are arranged the one, two and three hundred connectors of the first thousand and are marked "100," "200" and "300", respectively. To the right of these connectors are located in turn, under the column marked, "2000 2nd sel.," the one, two and three hundred second-selectors of the second thousand and are marked "100," "200" and "300." To the right of these second-selectors and under the column "2000 con." are arranged the one, two and three hundred connectors of the second thousand and are marked "100," "200" and "300," and so on. Therefore, the strip of jacks $a'$, shown in Fig. 3, which is allotted to the second level of first-selectors is found under the "2000 2nd sel." column headed "100," and the strip $a^2$ allotted to the second level of the second-selectors F is located under the column "2000 con." under the head "200." It will be seen, therefore, that all of the strips $a$ of the one-hundreds of the various thousands are located at X, those of the two-hundreds at Y, and those of the three-hundreds at Z. Now if a call originates in the Z or 300-group, (Fig. 14,) for example, one of the lamps of that group will flash up and if the call is continued one of the lamps of the three-hundred second-selector strips, shown in the same horizontal row with the group Z, will flash up as soon as the lamp of the group Z goes out. If the lamp of the 300-strip of the one-thousand-group of second-selectors should be the one to light up, it will follow that the next lamp to light will be one of the lamps of the one-thousand-row of connectors, which are located immediately to the right, as shown. If the lamp of the strip of the 300-group of second-selectors in the two-thousand had been the one to flash up, then the next lamp to flash up will be in the group of connector strips immediately to the right of them. Therefore, an operator who is watching a call does not have to keep under her attention all of the strips in the system, but only the strips of the particular groups along which a call must follow. To illustrate again: If the call originates in the group X one of the lamps of that group will, of course, flash up and it will follow that if the call is continued the lamp of either of the strips $x$, $y$ or $z$ will flash up in turn, and if the lamp of the strip $x$ flashes up, then it must follow that one of the lamps of the strip $x^1$, $x^2$ or $x^3$ must be the next to flash up. If, instead, the lamp of the strip $y$ had flashed up, the first lamp to have flashed up would have been the lamp of either of the strips $y^1$, $y^2$ or $y^3$, and so on. With the means thus far disclosed it will not be easy for the operator to trace a call from the connectors back to the first-selectors, and in order that this may easily be done the operator is provided with an extra plug which is the terminal of a special busy circuit—that is, a busy circuit that produces a busy current different in character from any of the other busy circuits heretofore described. Evidently, then, if the operator wishes to trace a call from the 200-strip in the 2000—that is, from the strip $y^2$—he will insert this special busy plug into the particular jack 225 that marks the circuit to be traced. The operator then, with the testing plug $n$ (Fig. 2), will run down the 2000 selector strips immediately to the left of the strip $y^2$ until he finds this special busy current. If this should be found in the 100-strip—that is, the strip $y$ at the jack 232, for example—he will know that the call originated in one of the X strips. He will then proceed to test over the strip X, exactly as he tested the 200 second-selector strips, until he finds the special busy current again—for example, at the jack 40. He will then know that the call originated in the particular trunk that terminates in said jack 40. It will be apparent that the connection extends from the jack 40 to the jack 232 and to the jack 225 of the strip $y^2$. The object in thus detecting such a connection may be for any one of several reasons—for example, to make a record that the connection thus established did not release, so that the switches allotted to said jacks will be looked into. In this way the history of all switches that get a poor connection of some character or other may be kept for reference. The special busy plug, to which reference has been made, is shown in Fig. 2 at $A^2$, the interrupter $K'$ shown in connection therewith being of such character that the busy current induced in the coil $228^a$ is of a different character from the other busy-signals, as already explained. Now, if the plug $N'$ there shown is inserted in the jack 225 (Fig. 2), as already explained in connection with Fig. 14, then the circuit over which the operator gets the special busy signal when he strikes the jack 232, shown in Fig. 3, is as follows: from the plug $N'$ through the jack 225 (Fig. 2) to the vertical trunk conductor 192, thence through the side switch wiper 187 of the selector F (assuming that the selectors E and F have been the switches through which the connection has been established) to the jack 232, to the tip of the testing plug $n$, through the springs 222 and 223 of the key $c$, through the receiver 226, resistance coil $m$, through the springs 221 and 220 of the key $b$ to the battery lead 160, and back to the coil $228^a$. The circuit when the operator strikes the jack 40, as explained in connection with Fig. 14, instead of going through the jack 232 after leaving the side switch wiper 187 of the selector F, would extend through the side switch wiper 100 of the selector E, thence to the jack 40 and to the testing plug, through the receiver 226 and back to the coil $228^a$, as before.

From the foregoing it will be seen that I provide a manual switchboard arrangement that enables the attendant or operator thereof to quickly locate any off-normal switches, regardless of whether such switches are off-normal by reason of being in use by different subscribers, or because of breakage or grounding of the circuits or other trouble. The attendant or supervisory operator can, when an off-normal switch is discovered, quickly trace the connection back through any other switches that may be involved in the trouble, and if these switches refuse to release in response to the release-impulses transmitted by the operator or attendant, a memorandum of the trouble can then be made, so that a direct inspection and repair of the switches can be made. This manual board, however, places at the disposal of the attendant or supervisory operator suitable means for quickly ascertaining the condition of any trunk line in the exchange, or of any automatic switch in the exchange, without the necessity of directly inspecting such trunk line or automatic switch. Obviously, an arrangement of this kind is calculated to greatly facilitate and lessen the cost of supervision, as a large portion of the trouble which may be experienced in an exchange of this kind is of such character that it can all be easily remedied from one point, as, for example, from a single manual switchboard. Consequently the percentage of trouble requiring direct inspection or attention is considerably reduced, and is confined or limited to such things as cannot be remedied from the manual switchboard. In a district system such as shown, where more or less of the apparatus is located at outlying or sub-central stations, my arrangement is obviously of great value, as it enables an attendant or supervisory operator at the main station to take care of a large part of the trouble which otherwise would require direct inspection and attention at the said outlying or sub-central stations. Other advantages and uses will, however, be obvious to those skilled in the art.

What I claim as my invention is:—

1. In a trunking telephone system, line switches, selector switches including a side switch having a plurality of operative positions, a plurality of trunk lines extending from the line switches to the selector switches, a jack for each trunk line, said jacks divided into groups, a signal for each group, means for displaying said signal whenever any one of the trunks of its group is seized, and means for maintaining said signal displayed until the side switch of the seized selector leaves its second position.

2. In a trunking telephone system, first selector switches, second selector switches, side switches for said selector switches having a plurality of operative positions, a plurality of trunk lines extending from the first selectors to the second selectors, a jack for each trunk line, said jacks divided into groups, a signal for each group, means for displaying said signal whenever any one of the trunks of its group is seized, and means for maintaining said signal displayed until the side switch of the seized second selector leaves its second position.

3. In a trunking telephone system, a connector switch including a side switch having a plurality of operative positions, a plurality of trunk lines leading to said connector, a jack for each trunk line, said jacks divided into groups, a signal for each group adapted to be displayed as soon as a trunk is seized and to remain lighted until the side switch of the connector leaves its second position, a second signal for each of said groups adapted to be displayed when the connector passes to third position, a third signal for each of said groups included in a normally open circuit, and means for closing said circuit to ascertain if any connector is off normal when neither of the first two signals is displayed.

4. In a trunking telephone system, a plurality of selector switches, trunks extending to said switches, jacks divided into groups associated with said trunks, a busy signaling device for supplying busy test current to said jacks, and means independent of said jacks for extending a connection over said trunks to said switches.

5. In a trunking telephone system, a plurality of connectors, trunks extending to said connectors, jacks associated with said trunks, and a signaling device for supplying busy test current to said jacks and for also supplying busy signaling current to the calling subscriber when the called subscriber's line is busy.

6. In a trunking telephone system, a plurality of groups of trunks, a plurality of busy-signaling devices, one for each group, each producing a different character of busy-signal current, means for supervising a connection and for testing, and means for using the different busy signal currents for supervising and testing purposes and automatic progressively movable switches for extending a connection from the trunks.

7. A trunking telephone system comprising selectors and a connector, an operator's calling set, and an operator's plug provided with a plurality of keys, a jack associated with said connector with which said plug is adapted to engage, one of said keys adapted when thrown one way to connect the operator's set directly to the connector, and when thrown in the other direction to cause the release of the connector, and another of said keys adapted when operated to make the connector busy to all the selectors.

8. In a trunking telephone system, a selector switch comprising a supervisory relay, a supervisory signal controlled thereby, a busy signaling machine, and a busy circuit from the busy machine, said circuit controlled by said relay.

9. In a trunking telephone system, a selector switch comprising a supervisory relay, trunk lines including vertical and rotary conductors extending to said switch, and a normally open busy signal circuit to the vertical trunk conductor controlled by the supervisory relay.

10. In a trunking telephone system, a selector switch, a trunk line including vertical and rotary conductors extending to said switch, a supervisory relay in said switch bridged between the rotary conductor and ground in a normally closed circuit, a rotary line relay connected between the non-grounded terminal of the battery and the rotary conductor in a normally open circuit, and means for normally preventing the supervisory relay from energizing through said rotary line relay.

11. In a trunking telephone system, a line switch, first selector and second selector switches, a trunk-release circuit for releasing said first selector, and a supervisory relay normally bridged between one terminal of battery and the trunk-release conductor, and adapted to be energized as soon as the first selector grounds said trunk-release conductor.

12. In a trunking telephone system, a line switch, line conductors extending to said switch, outgoing trunk conductors extending from said switch, and means for releasing said switch by grounding either the line conductors or the trunk conductors.

13. In a trunking telephone system, a selector switch, a connector switch, a supervisory relay allotted to the connector, a back-release relay for said selector, and means for energizing said supervisory relay in series with the back-release relay, the resistance of the supervisory relay being such that the back-release relay will not operatively energize in series with the supervisory relay.

14. In a trunking telephone system, a selector, a back-release relay allotted thereto, a second selector, a supervisory relay allotted thereto, an energizing circuit for said supervisory relay including a back-release relay of said first selector, the resistance of said supervisory relay being such that the back-release relay will not operatively energize in series with the supervisory relay, as set forth.

15. In a trunking telephone system, a selector switch, a connector, a back-release relay at the selector, a couple of supervisory relays at the connector, energizing circuits for said supervisory relays, said circuits including the back-release relay, but the resistance of said supervisory relays being such that the said back-release relay will not operatively energize over a circuit containing said supervisory relays in multiple.

16. In a trunking telephone system, a main central office comprising an operator's equipment and first and second selectors, a sub-central station having a connector, means at the main central office for plugging directly onto the line leading to the connector and making the connector busy at the second-selectors, means for operating the said connector to establish connection with the line, a back-bridge relay and a private circuit relay for said connector, a pair of condensers in the line circuit at the sub-central station, means for energizing the back-bridge relay for short-circuiting said condensers, means by which the operator may then test the called line, and means by which the private circuit of the connector may be opened by energizing the private circuit relay, whereby the connector may be caused to connect with the busy line.

17. An automatic telephone exchange system comprising first-selectors, second-selectors and connectors, and a manual switchboard provided with a jack for each selector and connector and a signal common to said first selectors.

18. An automatic telephone exchange system comprising first and second selectors, and a manual switchboard provided with a jack for each selector of the exchange and a signal common to said first selectors.

19. An automatic telephone exchange system comprising first-selectors, second-selectors and connectors, a manual switchboard provided with a jack for each selector and connector, said jacks arranged in groups, visual signals associated with and indicating the different groups of jacks, and means for plugging into said jacks.

20. An automatic telephone exchange system comprising first-selectors, a manual switchboard provided with a jack for each selector of the exchange, said jacks arranged in groups, visual signals associated with and indicating the different groups of jacks, and means for plugging into said jacks.

21. An automatic telephone exchange system comprising first and second selectors, a manual switchboard provided with a jack for each selector of the exchange, said jacks arranged in groups, visual signals associated with and indicating the different groups of jacks, and means for plugging into said jacks.

22. An automatic telephone exchange system comprising automatic connectors for completing connection with the lines of called subscribers, a manual switchboard provided with a jack for each connector of the exchange, said jacks arranged in groups, visual signals associated with and indicating the different groups of jacks, and means for plugging into said jacks.

23. An automatic telephone exchange system comprising subscribers' lines, automatic means for trunking calling lines into connection with the called lines, a manual switchboard provided with jacks corresponding to the different trunks of said automatic means for trunking between subscribers, said jacks arranged in groups, visual signals associated with and indicating the different groups of jacks, and means for plugging into said jacks.

24. An automatic telephone exchange system comprising subscribers' individual trunking switches, automatic means for extending connection from the individual switches to the called subscribers, and a manual switchboard equipped with jacks and visual signals and testing devices for determining the condition of any portion of said automatic means.

25. A telephone exchange system comprising subscribers' lines, trunks and automatic trunking switches for extending connection from calling lines to called lines, a manual switchboard suitably connected with all of the different trunks, and means on said switchboard for tracing a call from any calling line through the different trunks and switches to any called line.

26. An automatic telephone exchange system comprising subscriber-controlled automatic switches, a manual switchboard suitably connected with said switches, visual signals on said switchboard, adapted to indicate off-normal switches, and means at said switchboard for locating the off-normal switches.

27. An automatic telephone exchange system comprising subscriber-controlled automatic switches arranged in groups, a manual switchboard provided with visual signals for indicating off-normal switches, adapted to designate the groups in which the off-normal switches will be found, and means at said switchboard for then definitely locating the off-normal switches.

28. A telephone exchange system comprising subscriber-controlled automatic connectors, each connector provided with a switching device having three positions, a manual switchboard suitably connected with said connectors, and means at said switchboard for locating off-normal connectors, adapted to show whether the off-normal connectors are in either first and second positions or third position.

29. An automatic telephone exchange system comprising subscriber-controlled automatic connectors, each connector provided with a switching device having three positions, a manual switchboard suitably connected with said connectors, and visual signals disposed on said switchboard, some of said signals indicating first or second position of the connectors, and other signals indicating third position of the connectors.

30. An automatic telephone exchange system comprising subscriber-controlled automatic connectors, each connector provided with a switching device having three positions, a manual switchboard suitably connected with said connectors, and lamps on said switchboard to indicate either the first and second positions or the third position of the connectors.

31. An automatic telephone exchange system comprising subscriber-controlled automatic switches, a manual switchboard suitably connected with said switches, lamp signals on said switchboard, automatic means by which a lamp signal is displayed while an automatic switch is in operation and retired upon the completion of such operation, and means at said switchboard for locating off-normal switches.

32. A telephone exchange system comprising first and second selectors, a manual switchboard suitably connected with the said second-selectors, and means at said switchboard for locating off-normal second-selectors.

33. A telephone exchange system comprising first and second selectors, a manual switchboard, a plurality of jacks disposed on said switchboard, there being a jack for each second-selector, bank terminals connected in multiple with said jacks, and a signal common to said first selectors.

34. A telephone exchange system comprising subscriber-controlled automatic switches, each switch provided with a bank of trunk terminals arranged in different levels, said switches arranged in different groups corresponding to the different levels of the banks, a manual switchboard, and strips of jacks disposed on said switchboard, each strip of jacks indicating a different level in the banks.

35. A telephone exchange system comprising subscriber-controlled automatic switches, each switch provided with a bank of trunk terminals arranged in different levels, said switches arranged in different groups corresponding to the different levels of the banks, a manual switchboard, strips of jacks disposed on said switchboard, each strip of jacks indicating a different level in the banks, a visual signal for each strip of jacks, and means for locating the jack corresponding to any off-normal switch.

36. A telephone exchange system comprising connectors, a manual switchboard provided with a jack for each connector, means for locating the jacks of off-normal connectors, and means at the switchboard for effecting the release of any off-normal connectors.

37. A telephone exchange system comprising first and second selectors, a manual switchboard provided with a jack for each second-selector, means for locating the jacks corresponding to off-normal second-selectors, and means at the switchboard for effecting the release of any off-normal second-selectors.

38. A telephone exchange system comprising first-selectors, a manual switchboard provided with means for locating off-normal first-selectors, and means at said switchboard for effecting the release of any off-normal first-selectors.

39. A telephone exchange system comprising subscribers' lines, an individual trunking switch for each subscriber's line, a manual switchboard provided with a jack for each trunk leading from said individual switches, means at said switchboard for locating the jacks corresponding to off-normal individual switches, and means at said switchboard for effecting the release of any off-normal individual switches.

40. A telephone exchange system comprising subscriber-controlled automatic switches, means operable by said switches for indicating off-normal switches, and a manual switchboard equipped with means for effecting the release of any off-normal switches.

41. A telephone exchange system comprising subscribers' lines, trunks and automatic switches for extending connection from calling lines to called lines, automatic means for indicating off-normal switches, and means for tracing the connection from any calling line through the different trunks and off-normal switches to any called line.

42. An automatic telephone exchange system comprising first-selectors, second-selectors and connectors, the latter having vertical motion to select a group and rotary motion to connect with the called line therein, a manual switchboard provided with a jack for each selector and connector, said jacks arranged in groups, visual signals associated with and indicating the different groups of jacks, and means for plugging into said jacks.

43. An automatic telephone exchange system comprising first-selectors having vertical motion to select a group and rotary motion to connect with a trunk line therein, a manual switchboard provided with a jack for each selector of the exchange, said jacks arranged in groups, visual signals associated with and indicating the different groups of jacks, and means for plugging into said jacks.

44. An automatic telephone exchange system comprising first and second selectors having vertical motion to select a group and rotary motion to connect with a trunk line therein, a manual switchboard provided with a jack for each selector of the exchange, said jacks arranged in groups, visual signals associated with and indicating the different groups of jacks, and means for plugging into said jacks.

45. An automatic telephone exchange system comprising automatic connectors for completing connection with the lines of called subscribers, having vertical motion to select a group and rotary motion to connect with the called line therein, a manual switchboard provided with a jack for each connector of the exchange, said jacks arranged in groups, visual signals associated with and indicating the different groups of jacks, and means for plugging into said jacks.

46. An automatic telephone exchange system comprising subscribers' lines, automatic means for trunking calling lines into connection with the called lines, having vertical motion to select a group and rotary motion to connect with the called line therein, a manual switchboard provided with jacks corresponding to the different trunks of said automatic means for trunking between subscribers, said jacks arranged in groups, visual signals associated with and indicating the different groups of jacks, and means for plugging into said jacks.

47. An automatic telephone exchange system comprising subscribers' individual trunking switches, automatic means for extending connection from the individual switches to the called subscribers, having vertical motion to select a group and rotary motion to connect with the called line therein, and a manual switchboard equipped with jacks and visual signals and testing devices for determining the condition of any portion of said automatic means.

48. A telephone exchange system comprising subscribers' lines, trunks and automatic trunking switches for extending connection from calling lines to called lines, having vertical motion to select a group and rotary motion to connect with a trunk line therein, a manual switchboard suitably connected with all of the different trunks, and means on said switchboard for tracing a call from any calling line through the different trunks and switches to any called line.

49. A telephone exchange system comprising subscriber-controlled automatic connectors having vertical motion to select a group and rotary motion to connect with the called line therein, each connector provided with a switching device having three positions, a manual switchboard suitably connected with said connectors, and means at said switchboard for locating off-normal connectors, adapted to show whether the off-normal connectors are in either first and second positions or third position.

50. An automatic telephone exchange system comprising subscriber-controlled automatic connectors having vertical motion to select a group and rotary motion to connect with the called line therein, each connector provided with a switching device having three positions, a manual switchboard suitably connected with said connectors, and visual signals disposed on said switchboard, some of said signals indicating first and second position of the connectors, and other signals indicating third position of the connectors.

51. An automatic telephone exchange system comprising subscriber-controlled automatic connectors having vertical motion to select a group and rotary motion to connect with the called line therein, each connector provided with a switching device having three positions, a manual switchboard suitably connected with said connectors, and lamps on said switchboard to indicate either the first and second positions or the third position of the connectors.

52. A telephone exchange system comprising first and second selectors having vertical motion to select a group and rotary motion to connect with a trunk line therein, a manual switchboard suitably connected with the said second-selectors, and means at said switchboard for locating off-normal second-selectors.

53. A telephone exchange system comprising connectors having vertical motion to select a group and rotary motion to connect with the called line therein, a manual switchboard provided with a jack for each connector, means for locating the jacks of off-normal connectors, and means at the switchboard for effecting the release of any off-normal connectors.

54. A telephone exchange system comprising first and second selectors having vertical motion to select a group and rotary motion to connect with a trunk line therein, a manual switchboard provided with a jack for each second-selector, means for locating the jacks corresponding to off-normal second-selectors, and means at the switchboard for effecting the release of any off-normal second-selectors.

55. A telephone exchange system comprising first-selectors having vertical motion to select a group and rotary motion to connect with a trunk line therein, a manual switchboard provided with means for locating off-normal first-selectors, and means at said switchboard for effecting the release of any off-normal first-selectors.

56. In a telephone system, trunks divided into groups, jacks for each group, the jacks of each group lined up into strips, the various strips grouped together, a visual signal for each group of jacks under the common control of the corresponding group of trunks, and an audible signal for each trunk.

57. In a telephone system, trunks divided into groups, jacks for each group, the jacks of each group lined up into strips, the various strips grouped together, a visual signal for each group of jacks under the common control of the corresponding group of trunks, an audible signal for each trunk, an automatic switch for each trunk for controlling the signals associated with each trunk, said automatic switch provided with means for extending a circuit connection from a trunk of one of said groups to a trunk of another one of said groups.

58. In a telephone system, a subscriber's line, a plurality of trunk lines, an automatic switch, an operator's position, means for operating said switch to extend a connection from said line to one of said trunks, and means for automatically switching said connection to said operator's board in case said trunk line is out of order.

59. In a telephone system, a subscriber's line, an automatic switch, a plurality of trunk lines, an operator's position, means for extending a connection from said line to said switch, means for then operating said switch to connect with one of said trunk lines, and means for signaling said operator in case said trunk line is out of order.

60. An automatic telephone exchange system comprising first selectors, second selectors and connectors, a manual switchboard provided with a jack for each selector and connector, a supervisory visual signal common to the first selectors, a supervisory visual signal common to the second selectors, a current for operating the same, another source of signaling current common to the first selectors, another source of signaling current common to the second selectors, and means responsive to said source common to the first selectors for producing an audible signal of a certain character and responsive to the signaling current of the second selectors for producing an audible signal of a different character.

Signed by me at Chicago, Cook county, Illinois, this 10th day of May, 1907.

ALEXANDER E. KEITH.

Witnesses:
HARRY J. GUTTMAN,
EDWARD D. FALES.